(12) United States Patent
Ali et al.

(10) Patent No.: US 8,091,087 B2
(45) Date of Patent: Jan. 3, 2012

(54) SCHEDULING OF NEW JOB WITHIN A START TIME RANGE BASED ON CALCULATED CURRENT LOAD AND PREDICTED LOAD VALUE OF THE NEW JOB ON MEDIA RESOURCES

(75) Inventors: Abid Ali, Andhra Pradesh (IN); Asim Mitra, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 1292 days.

(21) Appl. No.: 11/737,916

(22) Filed: Apr. 20, 2007

(65) Prior Publication Data

US 2008/0263551 A1    Oct. 23, 2008

(51) Int. Cl.
*G06F 9/45* (2006.01)
(52) U.S. Cl. ......... 718/102; 718/100; 718/103; 718/105
(58) Field of Classification Search .................. 718/100, 718/102, 103, 105
See application file for complete search history.

(56) References Cited

U.S. PATENT DOCUMENTS

| | | | |
|---|---|---|---|
| 5,765,173 A | 6/1998 | Cane et al. | |
| 5,854,754 A * | 12/1998 | Cabrera et al. | 703/2 |
| 5,881,284 A * | 3/1999 | Kubo | 718/100 |
| 5,881,311 A | 3/1999 | Woods | |
| 5,920,700 A | 7/1999 | Gordon et al. | |
| 6,311,251 B1 | 10/2001 | Merritt et al. | |
| 6,868,478 B2 | 3/2005 | Kishi et al. | |
| 6,957,433 B2 * | 10/2005 | Umberger et al. | 718/103 |
| 7,069,295 B2 | 6/2006 | Sutherland et al. | |
| 7,085,904 B2 * | 8/2006 | Mizuno et al. | 711/162 |
| 7,114,013 B2 | 9/2006 | Bakke et al. | |
| 7,155,723 B2 * | 12/2006 | Swildens et al. | 718/105 |
| 7,343,356 B2 * | 3/2008 | Prahlad et al. | 705/400 |
| 7,707,577 B2 * | 4/2010 | Inaba | 718/102 |
| 2002/0091707 A1 * | 7/2002 | Keller | 707/104.1 |
| 2004/0039891 A1 | 2/2004 | Leung et al. | |
| 2004/0250249 A1 * | 12/2004 | Fukunari et al. | 718/100 |
| 2005/0021524 A1 * | 1/2005 | Oliver | 707/100 |
| 2005/0268299 A1 * | 12/2005 | Picinich et al. | 718/100 |

(Continued)

OTHER PUBLICATIONS

Veritas Netbackup Backup Planning and Performance Tuning Guide, Sep. 10, 2099, Symantec, Release 6.5.*

(Continued)

*Primary Examiner* — Meng An
*Assistant Examiner* — Abu Ghaffari
(74) *Attorney, Agent, or Firm* — Senniger Powers LLP

(57) ABSTRACT

Method for scheduling a new backup job within a backup application to optimize a utilization of a media resource of said backup application. The backup application includes one or more previously scheduled backup jobs. The backup application calculates a current load of the media resource as a function of the previously scheduled backup jobs and the media resource and predicts a load value for the new backup job as a function of job parameters associated with the new backup job. Then, the backup application schedules the new backup job as a function of the calculated current load and the predicted load value such that the resulting load on the media resource will yield a minimum peak percentage utilization of the media resource. Alternatively, the backup application schedules the new backup job and previously scheduled backup jobs as function of the calculated current load and the predicted load value such that the resulting load on the media resource will yield a minimum peak percentage utilization of the media resource.

18 Claims, 10 Drawing Sheets

U.S. PATENT DOCUMENTS

| | | |
|---|---|---|
| 2006/0075007 A1 | 4/2006 | Anderson et al. |
| 2006/0265507 A1 | 11/2006 | Banga et al. |
| 2007/0050490 A1* | 3/2007 | Larkin .......................... 709/223 |
| 2008/0222646 A1* | 9/2008 | Sigal et al. .................... 718/105 |
| 2008/0253746 A1 | 10/2008 | Wood |

OTHER PUBLICATIONS

Nalini et al., Load Management in Distributed Video Servers, 1997, IEEE, pp. 528-535.*

Kaczmarski et al., Beyond Backup toward storage management, 2003, IBM System Journal, vol. 42, No. 2, 322-337.*

Shen et al., "A Distributed Multi-Storage Resource Architecture and I/O Performance Prediction for Scientific Computing," Cluster computing 6, 2003, pp. 189-200, Kluwer Academic Publishers, The Netherlands.

Buck et al., "Dynamic Hierarchies and Optimization in Distributed Storage Systems," IEEE, 1991, pp. 85-91, IBM, USA.

Shen et al., "Remote I/O Optimization and Evaluation for Tertiary Storage Systems Through Storage Resource Broker," 14 pages, USA.

* cited by examiner

Algorithm 2

Algorithm 3

SCHEDULING OF NEW JOB WITHIN A START TIME RANGE BASED ON CALCULATED CURRENT LOAD AND PREDICTED LOAD VALUE OF THE NEW JOB ON MEDIA RESOURCES

BACKGROUND

Utilization of media resources (disk, tape drives or library media) of a backup application is a major bottleneck for performance and scalability of a backup system. Ideally, each media resource should be utilized at a 100% load. Because there are many types of backups and many types of media resources, it is difficult to obtain uniform utilization of the media resources without a great deal of experimentation by a backup administrator.

Additionally, backups must be scheduled with the business needs of a customer in mind. For example, an order processing application may not be able to maintain acceptable user response times while creating backup data during peak user periods. Therefore, the backup of the order processing application should be scheduled during non-peak user periods.

SUMMARY

Embodiments of the invention overcome one or more disadvantages of the lack of uniform utilization of the media resources by predicting the load of a new backup job and scheduling it to optimize a utilization of a media resource.

Aspects of the invention include receiving a request to schedule a new backup job of a backup application and predicting a load of the backup job. A current load of the media resources of the backup application is calculated and new backup job is scheduled to optimize the utilization of the media resource. As such, aspects of the invention allow the scheduling of backup jobs to optimize the utilization of the media resource without experimentation by the backup administrator.

Aspects of the invention also include varying the start time of the new backup job of the backup application to optimize the utilization of the media resource.

Aspects of the invention also include re-scheduling previously scheduled backup jobs of the backup application as well as the new backup job to optimize the utilization of a media resource.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
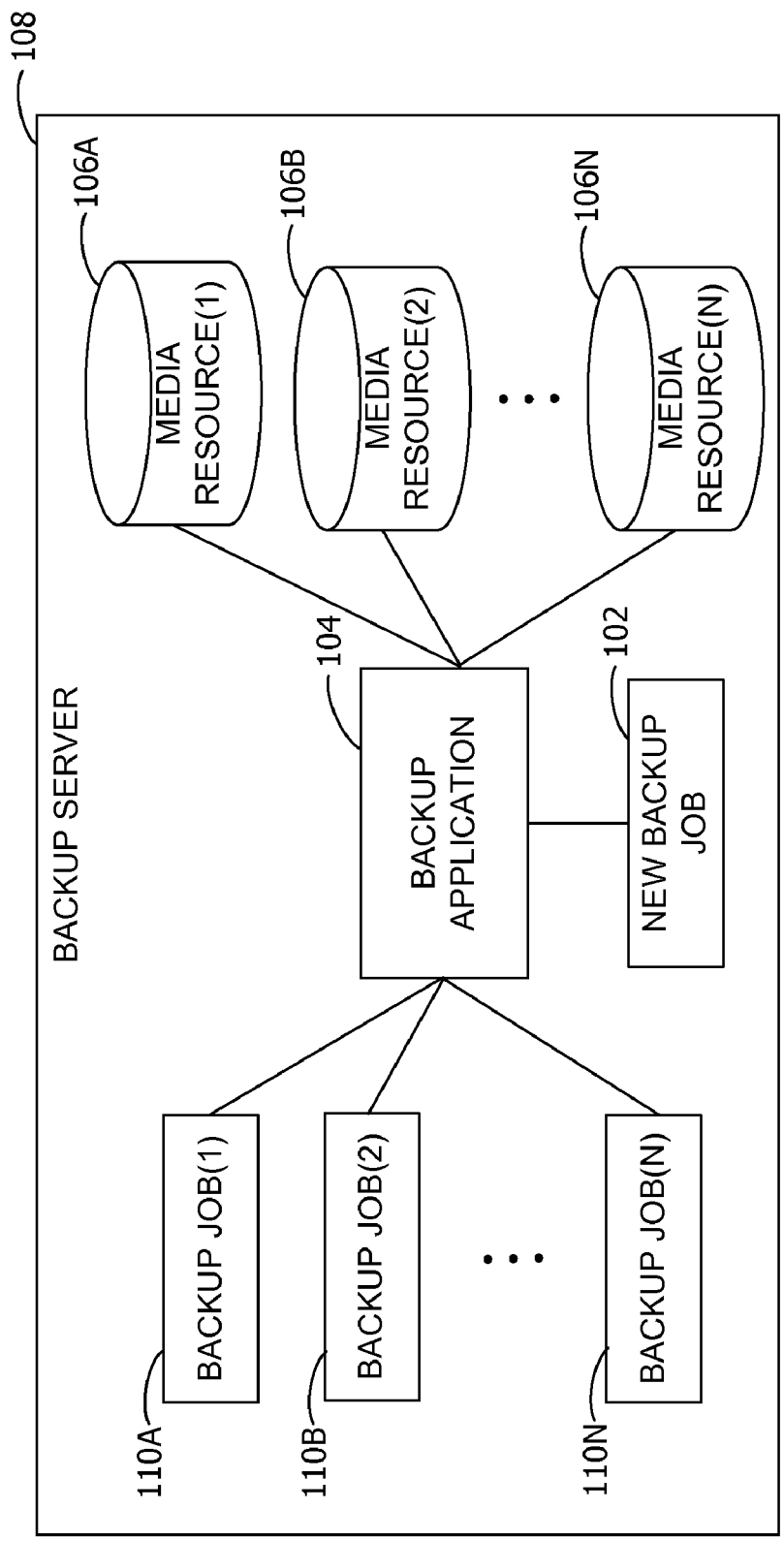
FIG. 1 is a block diagram illustrating one example of a suitable computing system environment for scheduling a new backup job within a backup application.

FIG. 1 illustrates an exemplary operating environment for scheduling a new backup job 102 within a backup application 104 to optimize a utilization of a media resource 106 of a backup server 108. In an embodiment, scheduling the new backup job 102 comprises selecting a media resource 106 for the backup job 102 or selecting a time to begin the backup job 102, or both. The backup application 104 includes one or more previously scheduled backup jobs 110. For purposes of illustration, programs and other executable program components, such as the backup application 104, are illustrated herein as discrete blocks. It is recognized, however, that such programs and components reside at various times in different storage components of the computer, and are executed by the data processor(s) of the computer. Furthermore, the media resources (e.g. media resource (1) 106A, media resource (2) 106B and media resource (N) 106N) illustrated in FIG. 1 include removable/non-removable, volatile/nonvolatile computer storage media include, but are not limited to, a disk drive, a tape drive, a CD drive, a DVD drive, a magnetic disk drive, optical disk, magnetic tape cassettes, flash memory cards, digital versatile disks, digital video tape, solid state RAM, solid state ROM, and the like.

The backup server 108 is configured with instructions for calculating a current load of the media resource 106 as a function of the previously scheduled backup jobs 110 and the media resource 106. Additionally, the backup server 108 predicts a load value for the new backup job 102 as a function of job parameters associated with the new backup job 102. In an embodiment, the job parameters associated with the new backup job 102 includes one or more of the following: the time of the backup job, the frequency of a backup job, the estimated duration of a backup job, the size of the data to back up, the amount of data churn associated with the backup job, speed of a data transfer between the data of the backup job and the media resource, and the type of backup job.

The backup server 108 schedules the new backup job 102 as a function of the calculated current load and the predicted load value such that the resulting load on the media resource 106 will yield a minimum peak percentage utilization of the media resource 106. In an alternative, the backup server 108 re-schedules the previously scheduled backup jobs 110 as well as scheduling the new backup job 102 as a function of the job parameters of the new backup job 102 and previously scheduled backup jobs 110 such that the resulting load on the media resource 106 will yield a minimum peak percentage utilization of the media resource 106.

Embodiments of the invention may be described in the general context of computer-executable instructions, such as program modules, executed by one or more computers or other devices. Generally, program modules (e.g., the backup application 104) include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules (e.g., the backup application 104) may be located in both local and remote computer storage media including memory storage devices.

FIG. 1 shows one example of a general purpose computing device in the form of the backup server 108. In one embodiment of the invention, a computer such as the backup server 108 is suitable for use in the other figures illustrated and described herein. The backup server 108 may also include other removable/non-removable, volatile/nonvolatile computer storage media. The computer storage media provide storage of computer readable instructions, data structures, program modules and other data for the backup server 108.

The backup server 108 typically has at least some form of computer readable media. Computer readable media, which include both volatile and nonvolatile media, removable and non-removable media, may be any available medium that may be accessed by backup server 108. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by backup server 108.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Figure 2:
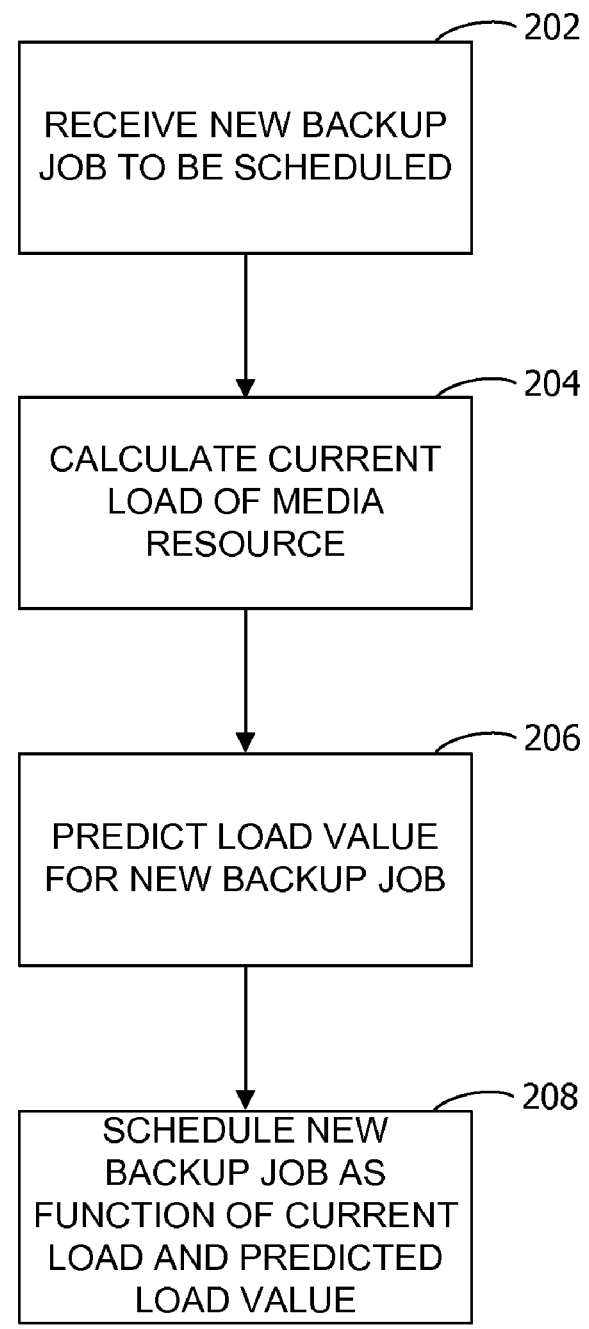
FIG. 2 is an exemplary flow diagram for scheduling a new backup job within a backup application to optimize the utilization of a media resource of the backup application.

FIG. 2 illustrates a flow diagram for scheduling a new backup job 102 within a backup application 104 to optimize the utilization of a media resource 106 of the backup application 104. The backup application 104 includes one or more previously scheduled backup jobs 110. At 202, the backup application 104 receives a new backup job 102 to be scheduled.

At 204, the backup application 104 calculates a current load of the media resource 106 as a function of the previously scheduled backup jobs 110 and the media resource 106. The current load is calculated as a function of one or more parameters associated with the previously scheduled backup jobs 110, including: the frequency of a previously scheduled backup job, the duration of a previously scheduled backup job, the size of the data to back up by a previously scheduled backup job, the amount of data churn (e.g., proportion of data which was added, deleted, or updated) between backups associated with a previously scheduled backup job, speed of a data transfer between the data of the previously scheduled backup job and the media resource 106, the type of previously scheduled backup jobs 110 and the input/output speed of the media resource 106. The types of previously scheduled backup jobs 110 may include, but is not limited to, shadow copies, replicas, full, incremental, data and transaction logs, and the like. Alternatively, the current load may be calculated as a function of historical load data of the media resource 106 as the previously scheduled backup jobs 110 are executed.

At 206, the backup application 104 predicts a load value for the new backup job 102 as a function of job parameters associated with the new backup job 102. The load value is calculated as a function of one or more parameters associated with the new backup job 102, including: the frequency of the new backup job 102, the estimated duration of the new backup job 102, the estimated size of the data to be back up by the new backup job 102, the estimated amount of data churn (e.g., proportion of data which was added, deleted, or updated) between backups associated with the new backup job 102, speed of a data transfer between the data of the new backup job 102 and the media resource 106, the type of the new backup job 102 and the input/output speed of the media resource 106. The types of the new backup job 102 may include, but is not limited to, shadow copies, replicas, full, incremental, data and transaction logs, and the like.

At 208, the backup application 104 schedules the new backup job 102 as a function of the calculated current load and the predicted load value such that the resulting load on the media resource 106 will yield a minimum peak percentage utilization of the media resource 106. In an embodiment, the optimal minimum peak percentage utilization of the media resource 106 results in an approximately uniform utilization media resource 106 such that the utilization of the media resource 106 is less than 100%. The following algorithms illustrated in FIGS. 3-10 and discussed in detail below are exemplary in nature, and not limiting. Those skilled in the art will recognize that many other algorithms are possible within the scope of the invention. For example, it is contemplated that algorithms for scheduling by prioritizing the calculated current load, or scheduling by prioritizing the predicted load value or a combination of such algorithms, may be employed without departing from the scope of the invention.

Figure 3:
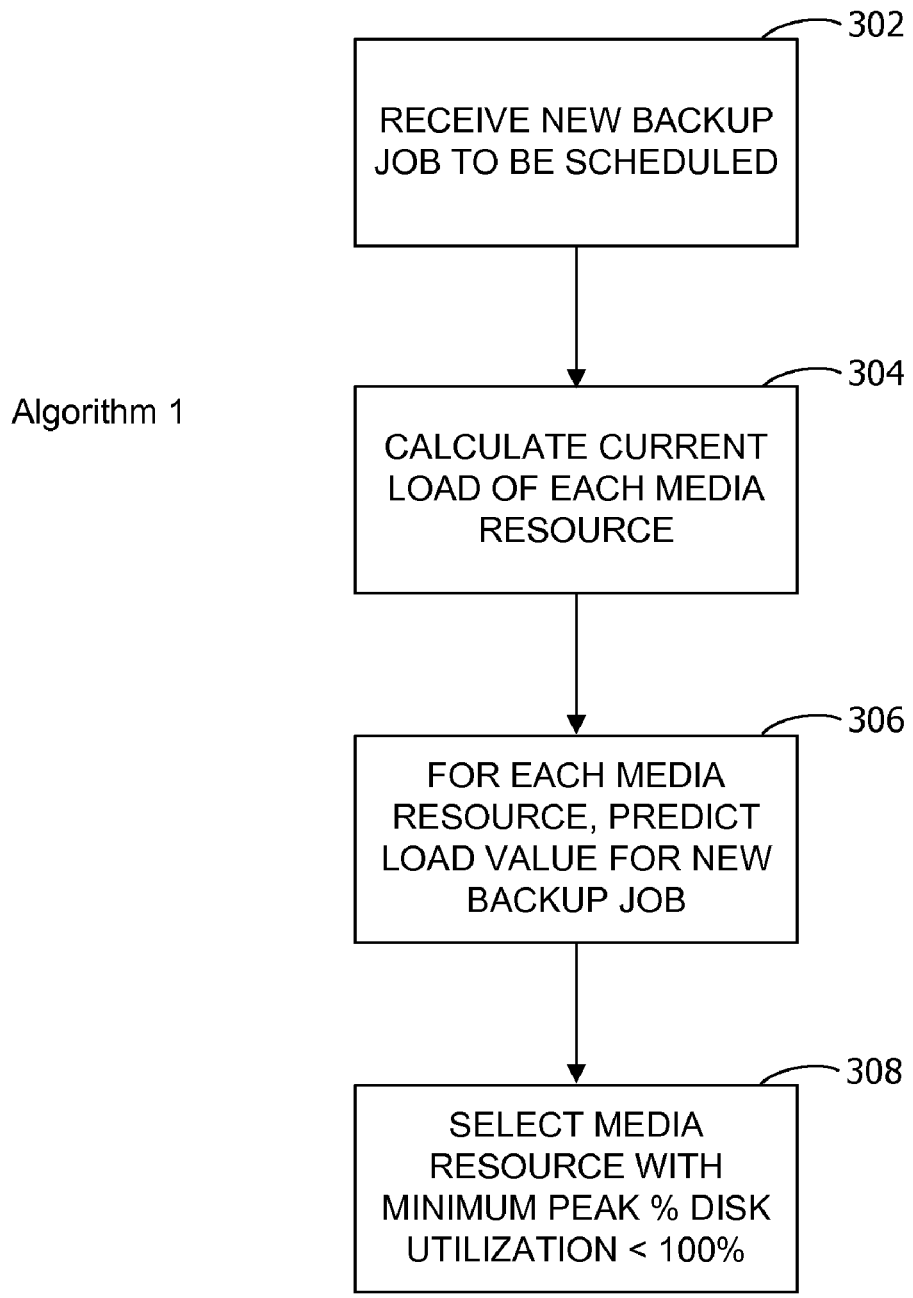
FIG. 3 is another exemplary flow diagram of an embodiment for scheduling a new backup job within a backup application to optimize the utilization of a plurality of media resources of the backup application.

FIGS. 3 and 4 illustrate an embodiment of an algorithm for scheduling a new backup job 102 within a backup application 104 to optimize the utilization of a plurality of media resources 106 of the backup application 104. In this embodiment, the backup application 104 includes one or more previously scheduled backup jobs 110. Furthermore, the algorithm of FIG. 3 may be implemented in backup server 108 instructions. Referring now to FIG. 3, at 302, the backup application 104 receives a new backup job 102 to be scheduled.

At 304, the backup application 104 calculates a current load for each of the plurality of media resources 106 as a function of the previously scheduled backup jobs 110 and the media resource 106. The current load is calculated as a function of one or more parameters associated with the previously scheduled backup jobs 110, including: the frequency of a previously scheduled backup job, the duration of a previously scheduled backup job, the size of the data to back up by a previously scheduled backup job, the amount of data churn (e.g., proportion of data which was added, deleted, or updated) between backups associated with a previously scheduled backup job, speed of a data transfer between the data of the previously scheduled backup job and the media resource 106, the type of previously scheduled backup job and the input/output speed of the media resource 106. The types of previously scheduled backup job may include, but is not limited to, shadow copies, replicas, data and logs, and the like. Alternatively, the current load may be calculated as a function of historical load data of each of the plurality of media resources 106 as the previously scheduled backup jobs 110 are executed.

At 306, the backup application 104 predicts a load value for the new backup job 102 as a function of job parameters associated with the new backup job 102. The load value is calculated as a function of one or more parameters associated with the new backup job 102, including: the frequency of the new backup job 102, the estimated duration of the new backup job 102, the estimated size of the data to be back up by the new backup job 102, the estimated amount of data churn (e.g., proportion of data which was added, deleted, or updated) between backups associated with the new backup job 102, speed of a data transfer between the data of the new backup job 102 and the media resource 106, the type of the new backup job 102 and the input/output speed of the media resource 106. The types of the new backup job 102 may include, but is not limited to, shadow copies, replicas, data and logs, and the like.

At 308, the backup application 104 schedules the new backup job 102 as a function of the calculated current load and the predicted load value such that the resulting load on the selected media resource 106 will yield a minimum peak percentage utilization across the plurality of media resources 106. In an embodiment, the optimal minimum peak percentage utilization of the media resource 106 results in an approximately uniform utilization of the plurality of media resources 106 such that the utilization of the media resource 106 is less than 100%.

Figure 4A:
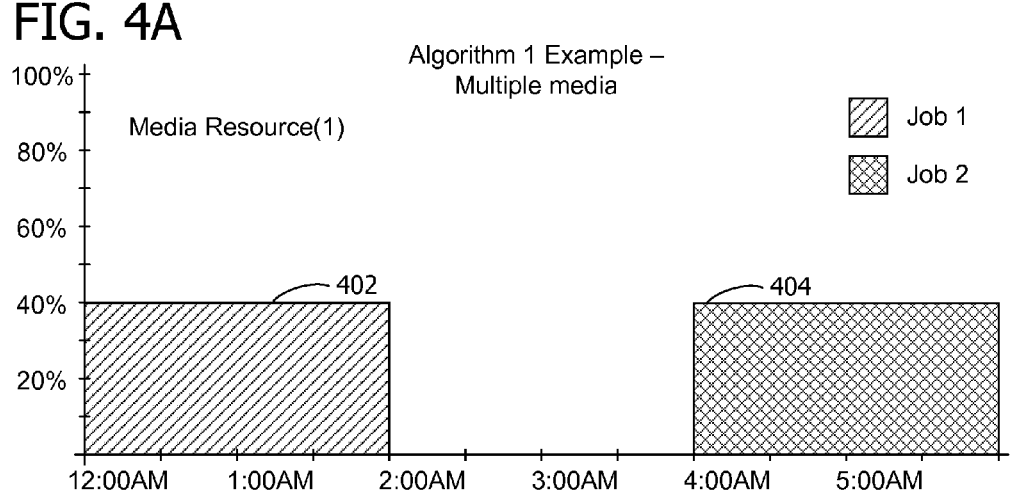
FIGS. 4A, 4B, 4C are exemplary block diagrams illustrating the load of a plurality of media resources.
Figure 4B:
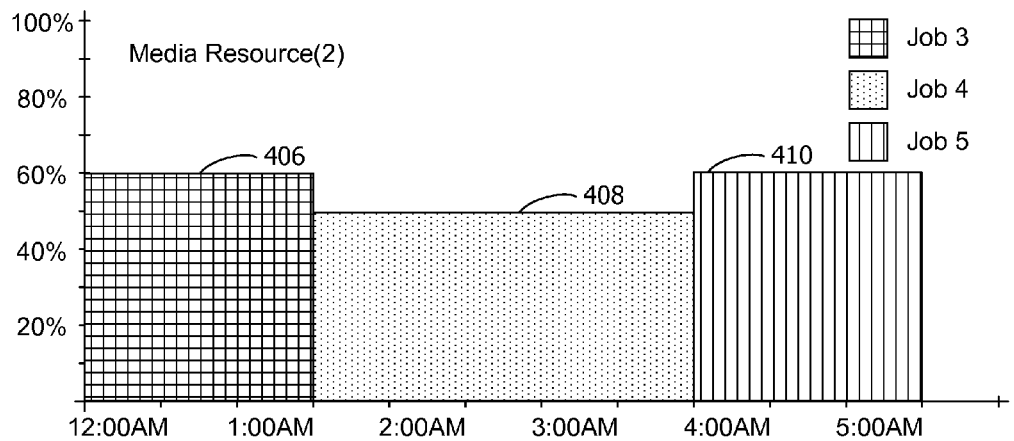
Figure 4C:
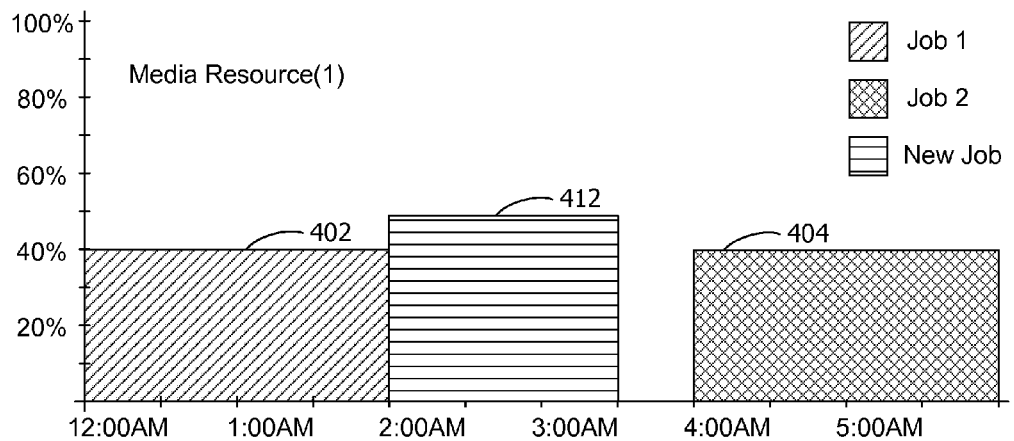

For example, FIG. 4A, 4B, 4C illustrate an embodiment with two media resources, media resource (1) FIG. 4A and media resource (2) 4B. Before a new backup job is scheduled, media resource (1) FIG. 4A has two backup jobs scheduled, job(1) 402 and job(2) 404. Job(1) 402 runs from 12:00 am to 2:00 am at a 40% load and job(2) 404 runs from 4:00 am to 6:00 am at a 40% load. Media resource (2) FIG. 4B has three backup jobs scheduled, job(3) 406, job(4) 408 and job(5) 410. Job(3) 406 runs from 12:00 am to 1:30 am at a 60% load, job(4) 408 runs from 1:30 am to 4:00 am at a 50% load and job(5) 404 runs from 4:00 am to 5:30 am at a 60% load.

A new backup job 412 that must run at 2:00 am for an hour and a half (2:00 am to 3:30 am) at 50% load is received. A media resource 106 will be selected from the plurality of media resources 106 such that an approximately uniform utilization of the plurality of media resources 106 results where the utilization of each media resource 106 is less than 100%. In this case, the new backup job 412 may be added to either media resource(1) FIG. 4A or media resource(2) FIG. 4B at 2:00 am and the resulting load on the resource will be less than 100%. For media resource(1) FIG. 4A, the resulting load from 2:00 am to 3:30 am will be 50% (0+50%). For media resource(2) FIG. 4B, the resulting load from 2:00 am to 3:30 am will be 90% (40+50%). But media resource(1) FIG. 4A will be selected for the new backup job 412 because it will yield an approximately uniform utilization of the plurality of media resources as shown in FIG. 4C.

Figure 5:
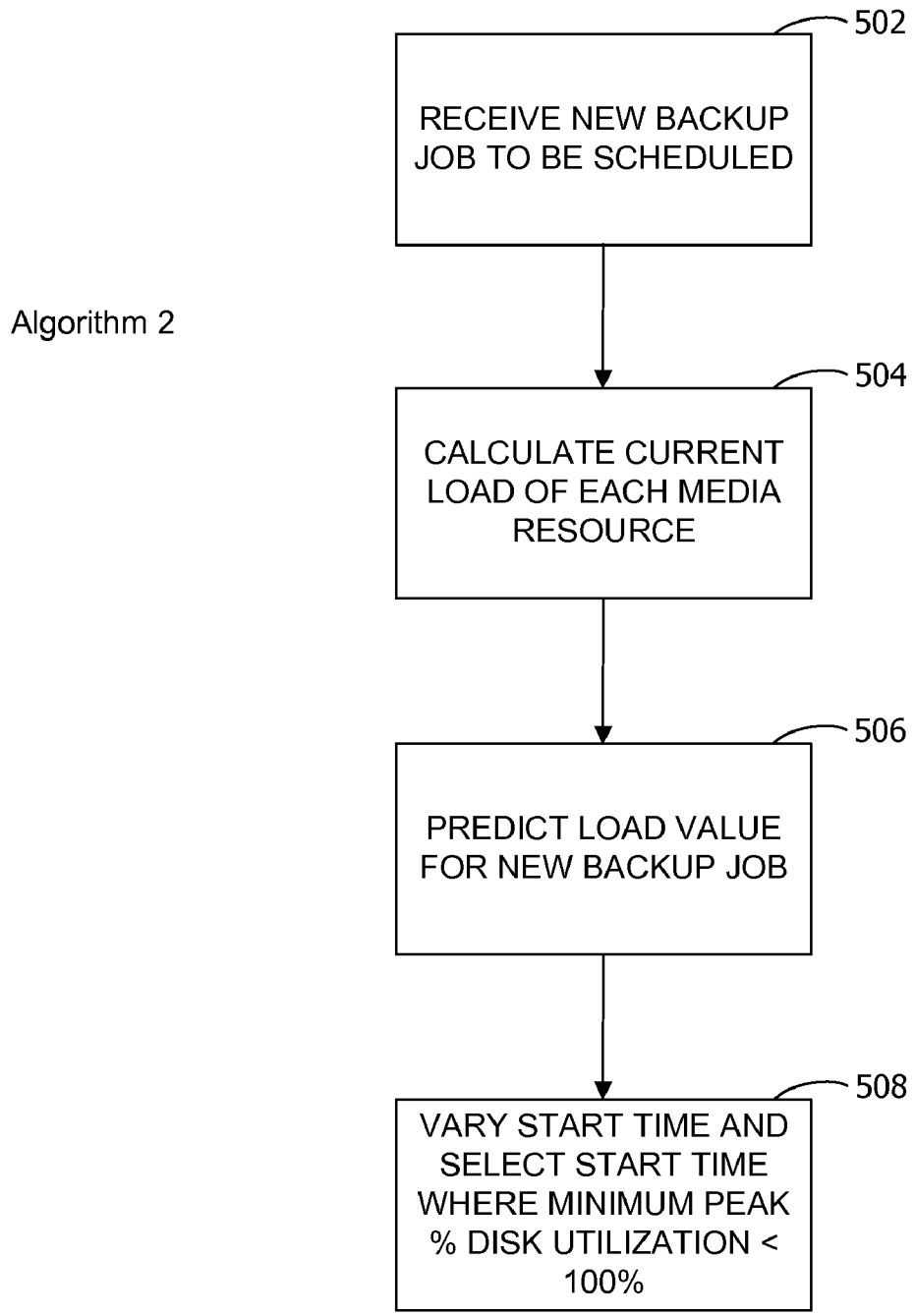
FIG. 5 is an exemplary flow diagram for varying the start time of a new backup job within a backup application to optimize the utilization of the backup application.

FIGS. 5 and 6 illustrate an embodiment of an algorithm for scheduling a new backup job 102 within a backup application 104 to optimize the utilization of a media resource 106 of the backup application 104 by varying the start time of the new backup job 102. Furthermore, the algorithm of FIG. 5 may be implemented in backup server 108 instructions. In this embodiment, the backup application 104 includes one or more previously scheduled backup jobs 110. Referring now to FIG. 5, at 502, the backup application 104 receives a new backup job 102 to be scheduled.

At 504, the backup application 104 calculates a current load for the media resource 106 as a function of the previously scheduled backup jobs 110 and the media resource 106. The current load is calculated as a function of one or more parameters associated with the previously scheduled backup jobs 110, including: the frequency of a previously scheduled backup job, the duration of a previously scheduled backup job, the size of the data to back up by a previously scheduled backup job, the amount of data churn (e.g., proportion of data which was added, deleted, or updated) between backups associated with a previously scheduled backup job, speed of a data transfer between the data of the previously scheduled backup job and the media resource 106, the type of previously scheduled backup job and the input/output speed of the media resource 106. The types of previously scheduled backup job may include, but is not limited to, shadow copies, replicas, data and logs, and the like. Alternatively, the current load may be calculated as a function of historical load data of each of the plurality of media resources 106 as the previously scheduled backup jobs 110 are executed.

At 506, the backup application 104 predicts a load value for the new backup job 102 as a function of job parameters associated with the new backup job 102. The load value is calculated as a function of one or more parameters associated with the new backup job 102, including: the frequency of the new backup job 102, the estimated duration of the new backup job 102, the estimated size of the data to be back up by the new backup job 102, the estimated amount of data churn (e.g., proportion of data which was added, deleted, or updated) between backups associated with the new backup job 102, speed of a data transfer between the data of the new backup job 102 and the media resource 106, the type of the new backup job 102 and the input/output speed of the media resource 106. The types of the new backup job 102 may include, but is not limited to, shadow copies, replicas, data and logs, and the like.

At 508, the backup application 104 schedules the new backup job 102 by varying the start time of the new backup job 102 as a function of the calculated current load and the predicted load value such that the resulting load on the selected media resource 106 will yield a minimum peak percentage utilization across the plurality of media resources 106. In an embodiment, a backup administrator specifies a range for the start time of the new backup job 102. In an embodiment, the optimal minimum peak percentage utilization of the media resource 106 results in an approximately uniform utilization of the plurality of media resources 106 such that the utilization of the media resource 106 is less than 100%.

Figure 6A:
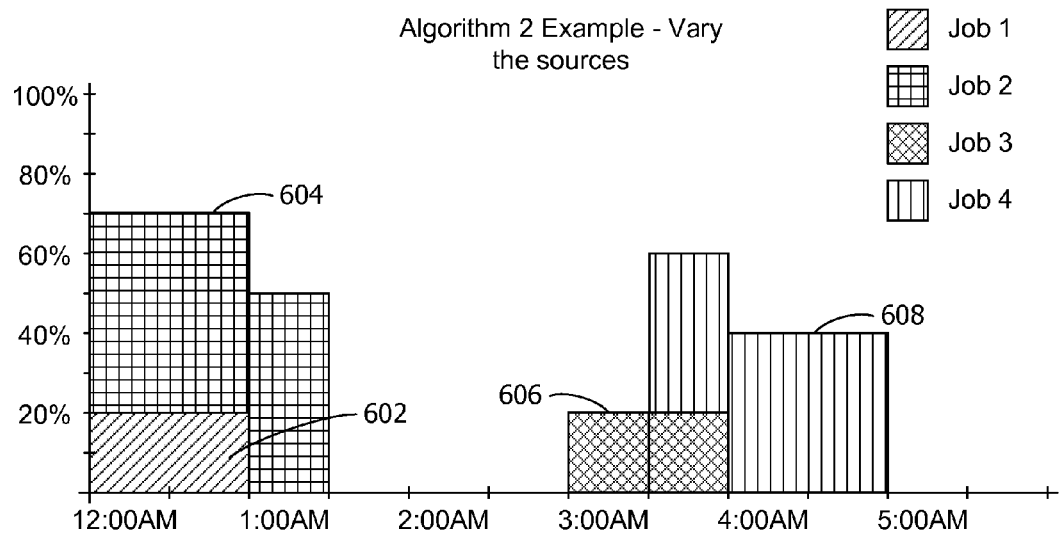
FIGS. 6A, 6B are exemplary block diagrams illustrating the load of a media resource.
Figure 6B:
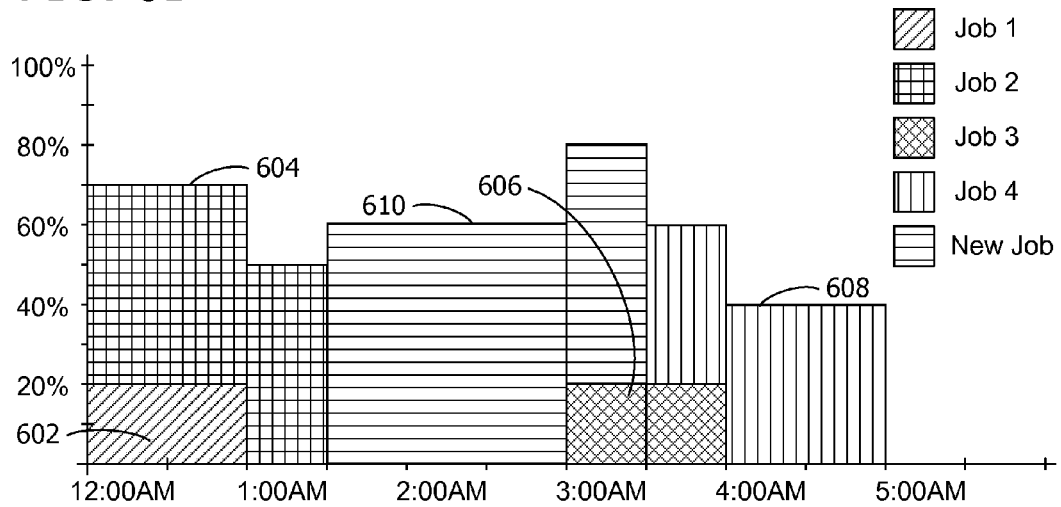

For example, FIGS. 6A, 6B illustrate an embodiment with one media resource, media resource(1) FIG. 6A. Before a new backup job is scheduled, media resource (1) FIG. 6A has four backup jobs scheduled, job(1) 602, job(2) 604, job(3) 606 and job(4) 608. Job(1) 602 runs from 12:00 am to 1:00 am at a 20% load, job(2) 604 runs from 12:00 am to 1:30 am at a 30% load, job(3) 606 runs from 3:00 am to 4:00 am at a 20% load and job(4) 608 runs from 3:30 am to 5:00 am at a 40% load.

A new backup job 610 that may start anytime between 1:00 am and 2:00 am for two hours at 60% load is received. The start time of the new backup job 610 will be selected to result in an approximately uniform utilization media resource 106 such that the utilization of the media resource 106 is less than 100%. If the new backup job 102 was started between 1:00 am or 2:00 am, the utilization of the media resource 106 would be greater than 100%. For example, job(2) 604 and the new backup job 102 would over lap between 1:00 am and 1:30 am and the resulting load would be 110% (50%+60%). Similarly, job(3) 606, job(4) 608 and the new backup job 102 would over lap between 3:30 am and 4:00 am and the resulting load would be 120% (20%+40%+60%). Therefore, the new backup job 610 will be scheduled to run from 1:30 am to 3:30 am as shown in FIG. 6B.

Figure 7:
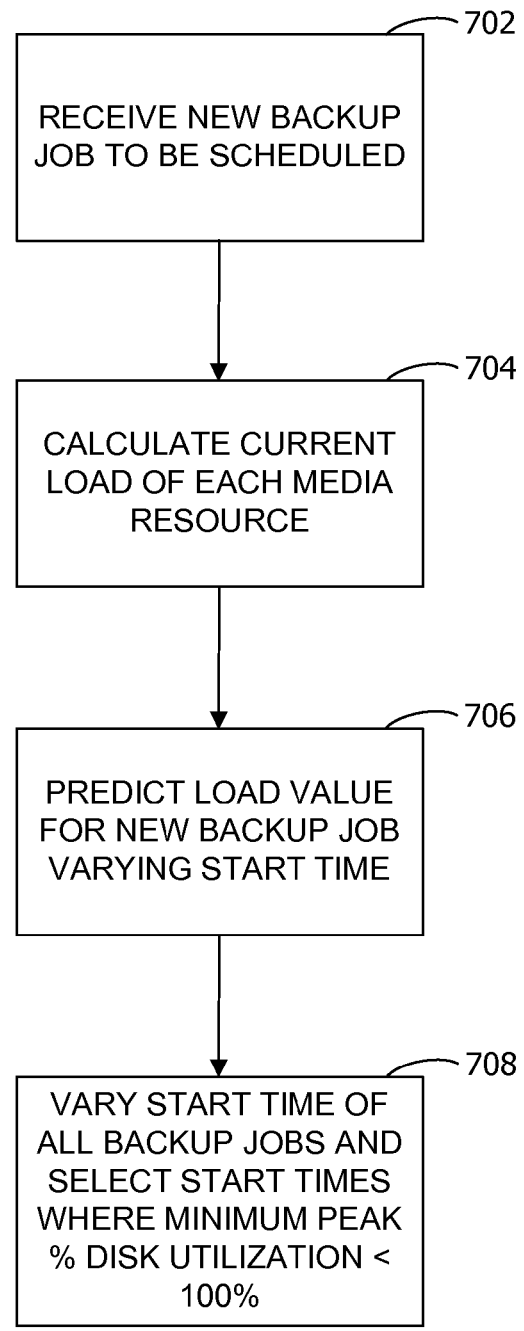
FIG. 7 is an exemplary flow diagram for scheduling a new backup job and re-scheduling previously scheduled backup jobs within a backup application to optimize the utilization of a media resource of the backup application.

FIGS. 7 and 8 illustrate an embodiment of an algorithm for scheduling a new backup job 102 within a backup application 104 to optimize the utilization of a media resource 106 of the backup application 104 by varying the start time of the new backup job 102 and one or more previously scheduled backup jobs 110. Furthermore, the algorithm of FIG. 7 may be implemented in backup server 108 instructions. Referring now to FIG. 7, at 702, the backup application 104 receives a new backup job 102 to be scheduled.

At 704, the backup application 104 calculates a current load for each of the media resource 106 as a function of the previously scheduled backup jobs 110 and the media resource 106. The current load is calculated as a function of one or more parameters associated with the previously scheduled backup jobs 110, including: the frequency of a previously scheduled backup job, the duration of a previously scheduled backup job, the size of the data to back up by a previously scheduled backup job, the amount of data churn (e.g., proportion of data which was added, deleted, or updated) between backups associated with a previously scheduled backup job, speed of a data transfer between the data of the previously scheduled backup job and the media resource 106, the type of previously scheduled backup job and the input/output speed of the media resource 106. The types of previously scheduled backup job may include, but is not limited to, shadow copies, replicas, data and logs, and the like. Alternatively, the current load may be calculated as a function of historical load data of each of the plurality of media resources 106 as the previously scheduled backup jobs 110 are executed.

At 706, the backup application 104 predicts a load value for the new backup job 102 as a function of job parameters associated with the new backup job 102. The load value is calculated as a function of one or more parameters associated with the new backup job 102, including: the frequency of the new backup job 102, the estimated duration of the new backup job 102, the estimated size of the data to be back up by the new backup job 102, the estimated amount of data churn (e.g., proportion of data which was added, deleted, or updated) between backups associated with the new backup job 102, speed of a data transfer between the data of the new backup job 102 and the media resource 106, the type of the new backup job 102 and the input/output speed of the media resource 106. The types of the new backup job 102 may include, but is not limited to, shadow copies, replicas, data and logs, and the like.

At 708, the backup application 104 schedules the new backup job 102 and re-schedules previously scheduled backup jobs 110 as a function of the job parameters of the new backup job 102 and previously scheduled backup jobs 110 such that the resulting load on the media resource 106 will yield a minimum peak percentage utilization of the media resource 106. In an embodiment, the new backup job 102 and the previously scheduled backup jobs 110 are scheduled by varying the start time of the jobs as a function of the calculated current load and the predicted load value such that the resulting load on the media resource 106 will yield a minimum peak percentage utilization of the media resource 106. In an embodiment, the backup administrator specifies a range for the start time of the new backup job 102. In another embodiment, the optimal minimum peak percentage utilization of the media resource 106 results in an approximately uniform utilization of the media resource 106 such that the utilization of the media resource 106 is less than 100%.

Figure 8A:
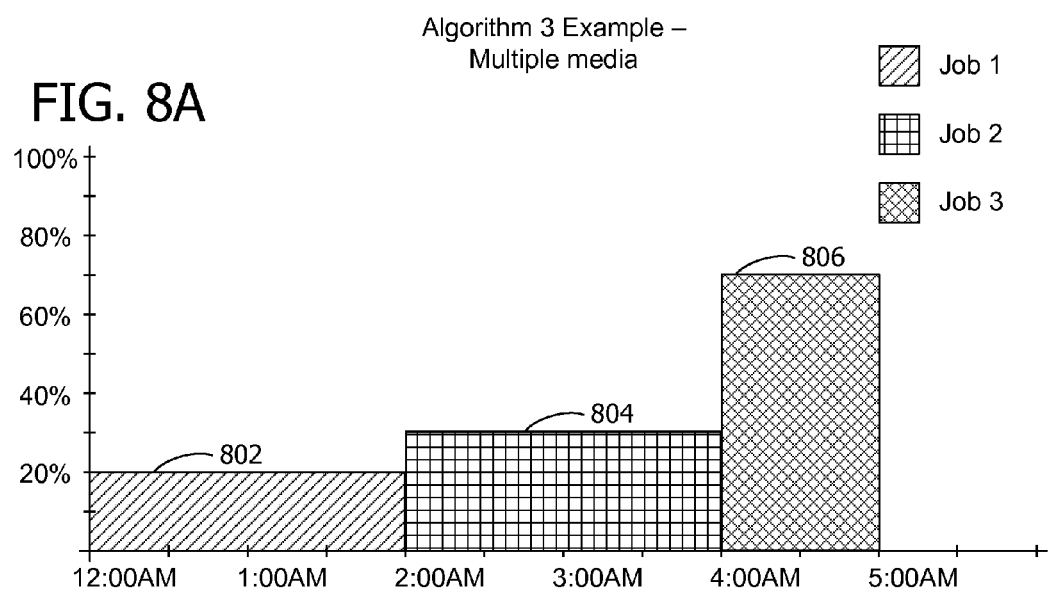
FIGS. 8A, 8B are exemplary block diagrams illustrating the load of a media resource.
Figure 8B:
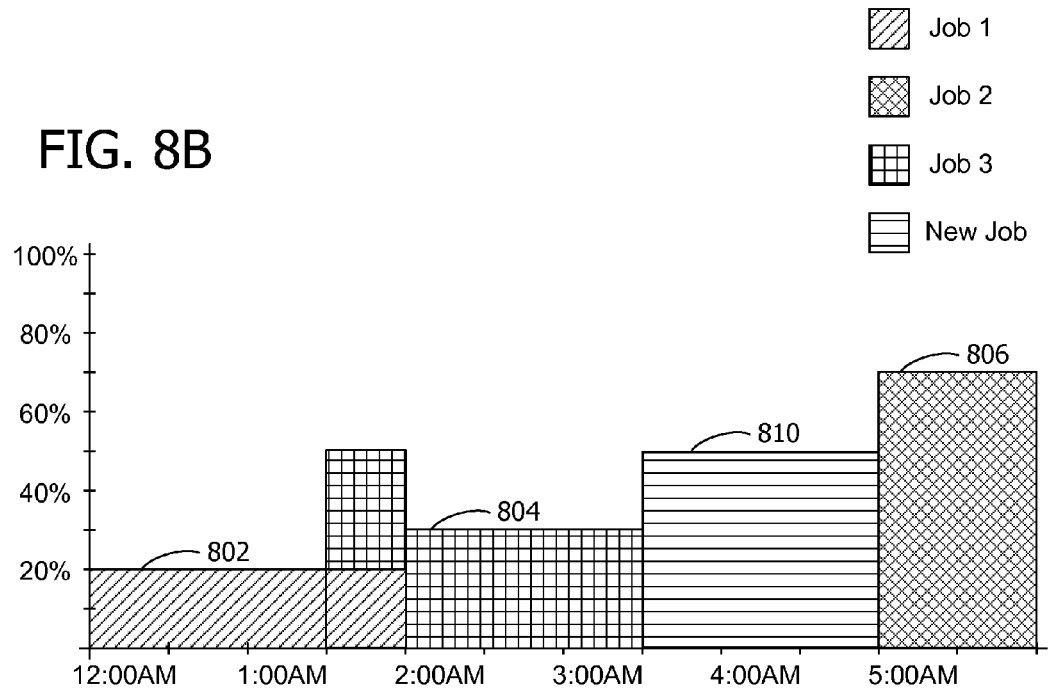

For example, FIGS. 8A, 8B illustrate an embodiment with one media resource, media resource(1) FIG. 8A. Before a new backup job is scheduled, media resource (1) FIG. 8A has four backup jobs scheduled, job(1) 802, job(2) 804, job(3) 806 and job(4) 808. Job(1) 802 runs from 12:00 am to 2:00 am at a 20% load starting at 12:00 am, job(2) 806 runs from 2:00 am to 4:00 am at a 30% load starting at 2:00 am, but may vary from 1:00 am to 3:00 and job(3) 804 runs from 5:00 am to 6:00 am at a 70% load beginning at 4:00 am, but may vary from 4:00 am to 5:00 am.

A new backup job 810 that may start anytime between 3:00 am and 4:00 am for one and half hours at 50% load is received. The start time of the new backup job 810 and the previously scheduled jobs will be selected resulting in an approximately uniform utilization media resource 106 such that the utilization of the media resource 106 is less than 100%. First, job(1) must start at 12:00 am, so it will be scheduled to start at 12:00 am. Second, if we do not change the start time of job(3), the new backup job will have to overlap job(3) resulting in utilization of over 100%. Thus, job(3) is moved to its latest start time, 5:00 am. Next, job(2) is started at 1:30 am and the new backup job is started at 3:30 am such that an approximately uniform utilization of the media resource 106 such that the utilization of the media resource 106 is less than 100% as shown in FIG. 8B.

Figure 9A:
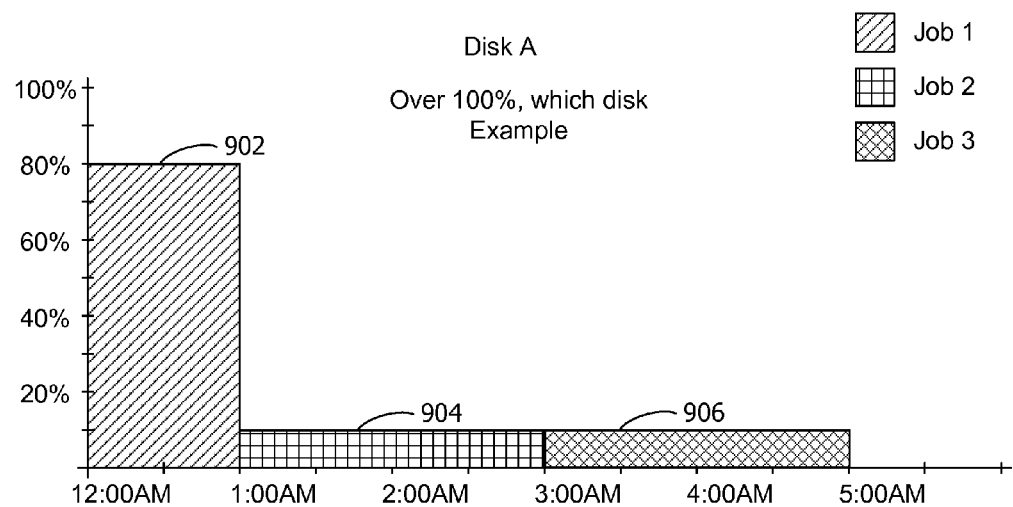
FIGS. 9A, 9B, are exemplary block diagrams illustrating the load of a plurality of media resources before a new backup job is scheduled.
Figure 9B:
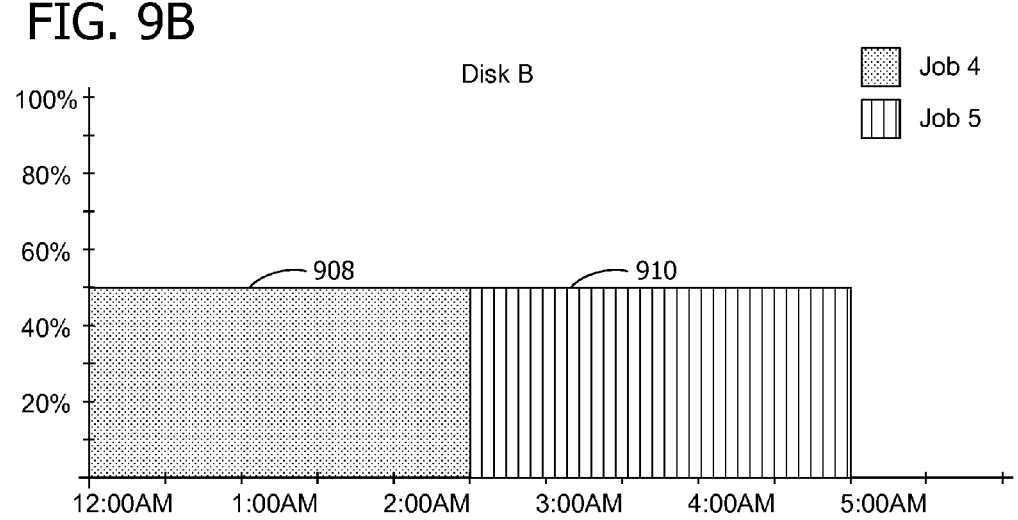

Referring next to FIG. 9, in some cases the optimal minimum peak percentage utilization of the media resource 106 results in an approximately uniform utilization of each of the media resources 106 even if the utilization of one or more of the media resources 106 is greater than 100%. For example, FIGS. 9A, 9B, 10A, 10B illustrate an embodiment with two media resources, media resource(1) FIG. 9A and media resource (2) FIG. 9B. Before a new backup job is scheduled, media resource(1) FIG. 9A has three backup jobs scheduled, job(1) 902, job(2) 904 and job(3) 906. Job(1) 902 runs from 12:00 am to 1:00 am at a 80% load, job(2) 904 runs from 1:00 am to 3:00 am at a 10% load and job(2) 906 runs from 3:00 am to 5:00 am at a 10% load. Media resource (2) FIG. 9B has two backup jobs scheduled, job(4) 908, and job(5) 910. Job(4) 908 runs from 12:00 am to 2:30 am at a 50% load and job(5) 910 runs from 2:30 am to 5:00 am at a 50% load.

A new backup job 912 that must run at 12:00 am for five hours (12:00 am to 5:00 am) at 40% load is received. A media resource will be selected from the plurality of media resources such that an approximately uniform utilization of the plurality of media resources results where the utilization of each media resource is less than 100%. In this case, if the new backup job 912 is scheduled on media resource(1) the resulting load from 12:00 am to 1:00 am would be over 100%.

Figure 10A:
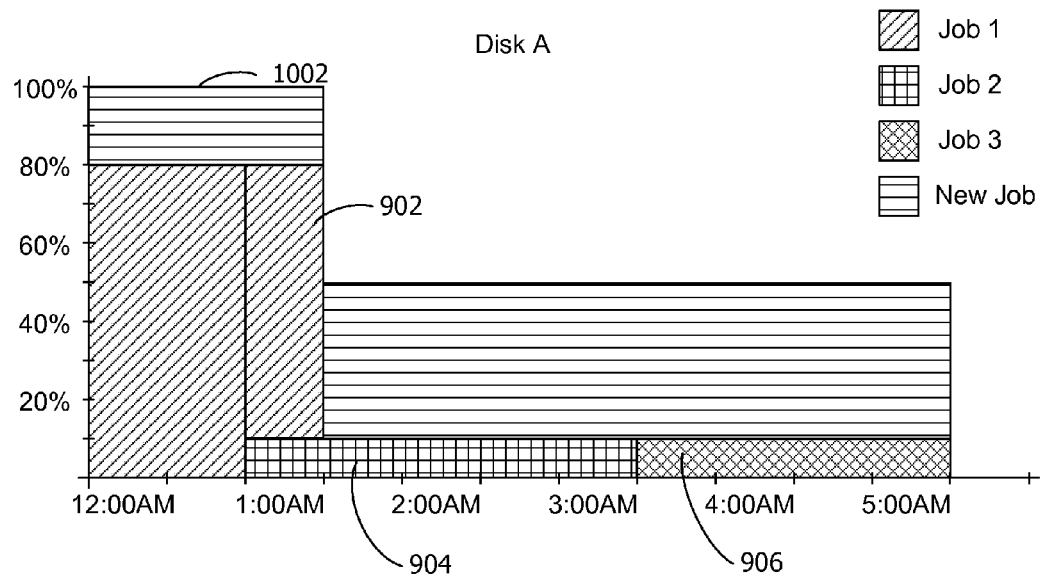
FIGS. 10A, 10B, are exemplary block diagrams illustrating the load of a plurality of media resources after a new backup job is scheduled.

However, this is impossible (a resource can not be utilized at over 100% its capacity). Because a media resource cannot be used at more than 100% utilization, in theory, a media resource which is at 200% utilization for an hour effectively means the media resource is at 100% utilization for 2 hours. In other words, utilization requirements beyond 100% of a media resource will be fulfilled by following underutilization of the media resource. In this case, the scheduled backup jobs will not fail, they will just take longer to execute. FIG. 10A illustrates the resulting load where the new backup job 102 is added to media resource(1), in this case the backup jobs will take longer and terminate at 5:30 am.

Figure 10B:
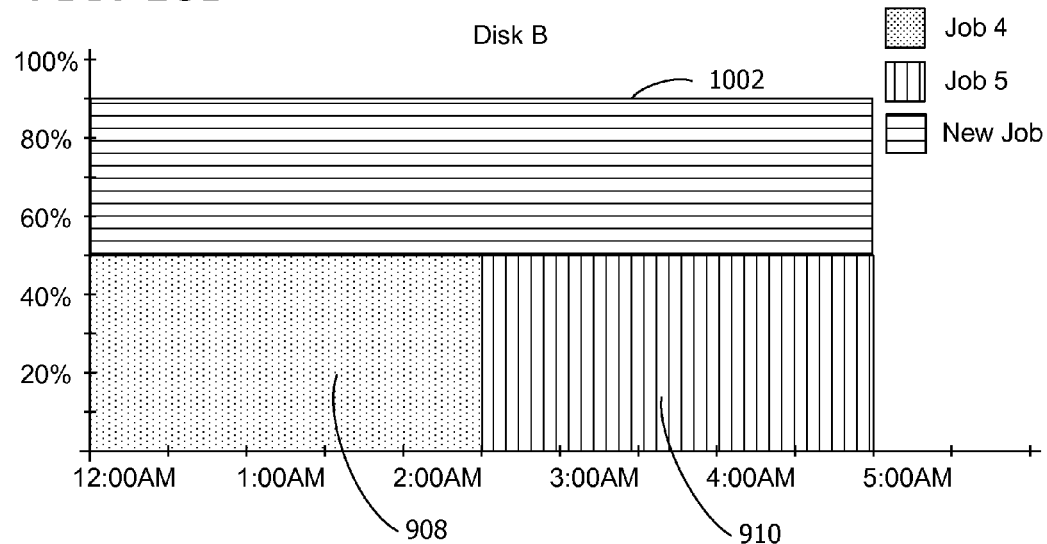

On the other hand, if the new backup job 102 is added to media resource(2) FIG. 9B at 12:00 am the resulting load on the resource will be 90% as shown in FIG. 10B. This would result in media resource (2) having a uniform load, however it will be significantly higher 90% for 5 hours than the media resource(1) without the new backup job 102 (shown in FIG. 9A) 90% for 1 hour and 10% for 4 hours. Thus, in scenarios where one media device has a significantly higher load, it is advantageous to schedule the job on the other media resource even if the utilization of the media device is over 100% to achieve an approximately uniform utilization the media resources. For example, if the new backup job 102 is added to media resource (1) as shown in FIG. 10A, the resulting load will 100% for one hour and 50% for four and half hours and media resource (2) will remain at 50% load for five hours as shown in FIG. 9B.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contrained in the above description and shown in the accompanying drawings shall be interpreted as illustrative and not in a limiting sense.

What is claimed is:

1. A method to schedule a new backup job within a backup application executing on a computing device to optimize a utilization of a media resource of said backup application, said backup application including one or more previously scheduled backup jobs, comprising:
    calculating, by the backup application executing on the computing device, a current load of the media resource as a function of the previously scheduled backup jobs to be executed for the media resource, said calculating being a function of one or more parameters associated with the previously scheduled backup jobs, said parameters including an amount of data churn associated with the new backup job;
    predicting, by the backup application executing on the computing device, a load value for the new backup job as a function of job parameters associated with the new backup job, said load value predicting the load that the new backup job will place on the media resource;
    scheduling, by the backup application executing on the computing device, the new backup job to begin at a start time as a function of the calculated current load of the media resource and the predicted load value for the new backup job such that the resulting load on the media resource will yield an optimal minimum peak percentage utilization of the media resource, wherein the new backup job start time comprises a start time range, wherein scheduling the new backup job includes varying the start time of the new backup job within the start time range.

2. The method of claim 1, wherein scheduling the new backup job comprises scheduling the new backup job and re-scheduling previously scheduled backup jobs as a function of the job parameters of the new backup job and previously scheduled backup jobs such that the resulting load on the media resource will yield a minimum peak percentage utilization of the media resource.

3. The method of claim 1, said parameters further including: the frequency of a backup job, the estimated duration of a backup job, the size of the data to back up, speed of a data transfer between the data of the backup job and the media resource, the type of backup job and the input/output speed of the media resource.

4. The method of claim 1, wherein the current load is calculated as a function of historical load data for the media resource as the previously scheduled backup jobs are executed, said historical load data comprising information related to previously executed backup jobs for the media resource.

5. The method of claim 1, wherein the media resource comprises one or more of the following: a disk drive, a tape drive, a CD drive and a DVD drive.

6. The method of claim 1, wherein the job parameters associated with the new backup job includes one or more of the following: the time of the backup job, the frequency of a backup job, the estimated duration of a backup job, the size of the data to back up, the amount of data churn associated with the backup job, speed of a data transfer between the data of the backup job and the media resource, and the type of backup job.

7. The method of claim 1, wherein the type of backup job includes one or more of the following: shadow copy, replica, full, transaction logs and incremental.

8. The method of claim 1, wherein the optimal minimum peak percentage utilization of the media resource results in an approximately uniform utilization of the media resource such that the utilization of the media resource is less than 100%.

9. The method of claim 1, wherein the media resource comprises a plurality of media resources and wherein said scheduling comprises scheduling the new backup job as a function of the calculated current load and the predicted load value such that the resulting load on the media resource will yield a minimum peak percentage utilization across the plurality of media resources.

10. The method of claim 1, wherein one or more tangible computer-readable storage media having computer-executable instructions stored thereon for performing the method of claim 1.

11. A system for scheduling a new backup job within a backup application executing on a backup server to optimize a utilization of a media resource of said backup application, said backup application including one or more previously scheduled backup jobs, comprising:
a backup server configured with instructions for:
calculating, by the backup application executing on the backup server, a current load of the media resource as a function of the previously scheduled backup jobs to be executed for the media resource, said calculating being a function of one or more parameters associated with the previously scheduled backup jobs, said parameters including an amount of data churn associated with the new backup job;
predicting, by the backup application executing on the backup server, a load value for the new backup job as a function of job parameters associated with the new backup job, said load value predicting the load that the new backup job will place on the media resource;
scheduling, by the backup application executing on the backup server, the new backup job to begin at a start time and re-scheduling the previously scheduled backup jobs as a function of the calculated current load and the predicted load value such that the resulting load on the media resource will yield a minimum peak percentage utilization of the media resource, wherein the new backup job start time comprises a start time range, wherein scheduling the new backup job includes varying the start time of the new backup job within the start time range.

12. The system of claim 11, wherein scheduling the new backup job comprises scheduling the new backup job and re-scheduling previously scheduled backup jobs as a function of the job parameters of the new backup job and previously scheduled backup jobs such that the resulting load on the media resource will yield a minimum peak percentage utilization of the media resource.

13. The system of claim 11, said parameters further including: the frequency of a backup job, the estimated duration of a backup job, the size of the data to back up, speed of a data transfer between the data of the backup job and the media resource, the type of backup job and the input/output speed of the media resource.

14. A method to schedule a new backup job within a backup application executing on a computing device to optimize a utilization of a plurality of remote media resources of said backup application, said backup application including one or more previously scheduled backup jobs, comprising:
calculating, by the backup application executing on the computing device, a current load of each of the plurality of media resources as a function of the previously scheduled backup jobs to be executed for each media resource, said calculating being a function of one or more parameters associated with the previously scheduled backup jobs, said parameters including the speed of a data transfer between the data of the new backup job to be backed up and each of the plurality of media resources;
predicting, by the backup application executing on the computing device, a load value for each of plurality of the media resources for the new backup job as a function of job parameters associated with the new backup job;
scheduling, by the backup application executing on the computing device, the new backup job to begin at a start time as a function of the calculated current load of each media resource and the predicted load value for each of the plurality of media resources such that the resulting load on the media resources will yield an optimal minimum peak percentage utilization across the plurality of media resources, wherein the new backup job start time comprises a start time range; and wherein scheduling the new backup job includes varying the start time of the new backup job within the start time range, and wherein said optimal minimum peak percentage utilization results in an approximately uniform utilization rate of less than 100%.

15. The method of claim 14, wherein the optimal minimum peak percentage utilization of the media resource results in an approximately uniform utilization of each of the media resources even if the predicted utilization of one or more of the media resources is greater than 100%.

16. The method of claim 14, wherein the media resource comprises one or more of the following: a disk drive, a tape drive, a CD drive and a DVD drive.

17. The method of claim 14, wherein the job parameters associated with the new backup job includes one or more of the following: the time of the backup job, the frequency of a backup job, the estimated duration of a backup job, the size of the data to back up, the amount of data churn associated with the backup job, and the type of backup job.

18. The method of claim 14, wherein the type of backup job includes
one or more of the following: shadow copy, replica, full, transaction logs and incremental.

* * * * *

UNITED STATES PATENT AND TRADEMARK OFFICE
CERTIFICATE OF CORRECTION

| | |
|---|---|
| PATENT NO. | : 8,091,087 B2 |
| APPLICATION NO. | : 11/737916 |
| DATED | : January 3, 2012 |
| INVENTOR(S) | : Ali et al. |

It is certified that error appears in the above-identified patent and that said Letters Patent is hereby corrected as shown below:

In Title page, in Item (57), under "ABSTRACT" column 2, line 15, delete "as function" and insert -- as a function --, therefor.

Signed and Sealed this
Twenty-seventh Day of March, 2012

David J. Kappos
*Director of the United States Patent and Trademark Office*